(12) United States Patent
Kageyama et al.

(10) Patent No.: US 6,704,265 B1
(45) Date of Patent: Mar. 9, 2004

(54) CARTRIDGE HOLDING MECHANISM FOR OPTICAL STORAGE DEVICE

(75) Inventors: Kazuhiko Kageyama, Kawasaki (JP); Hideo Nasu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 578 days.

(21) Appl. No.: 09/676,440

(22) Filed: Sep. 29, 2000

(30) Foreign Application Priority Data

Dec. 17, 1999 (JP) ............................................ 11-358302

(51) Int. Cl.[7] ............................................... G11B 33/02
(52) U.S. Cl. ....................................................... 369/75.2
(58) Field of Search ............................. 369/75.1, 75.2, 369/77.1, 77.2; 360/99.5, 99.02, 99.06

(56) References Cited

U.S. PATENT DOCUMENTS

| | | | | |
|---|---|---|---|---|
| 4,817,079 A | * | 3/1989 | Covington | 369/291 |
| 5,126,899 A | * | 6/1992 | Kanazawa | 360/99.07 |
| 5,385,235 A | * | 1/1995 | Ikebe et al. | 206/308.1 |
| 5,513,054 A | * | 4/1996 | Watanabe | 360/99.06 |
| 5,898,658 A | * | 4/1999 | Niioka et al. | 369/75.2 |
| 6,268,977 B1 | * | 7/2001 | Yamada et al. | 360/99.06 |
| 6,272,093 B1 | * | 8/2001 | Kurozuka et al. | 369/77.2 |
| 6,292,452 B1 | * | 9/2001 | Endo et al. | 369/75.2 |
| 6,314,076 B1 | * | 11/2001 | Arai et al. | 369/244 |
| 6,388,972 B1 | * | 5/2002 | Saitou et al. | 369/75.2 |
| 6,507,539 B2 | * | 1/2003 | Nishimoto | 369/13.12 |
| 2001/0028528 A1 | * | 10/2001 | Jitsukawa | 360/99.06 |

* cited by examiner

*Primary Examiner*—Julie Anne Watko
(74) *Attorney, Agent, or Firm*—Greer, Burns & Crain, Ltd.

(57) ABSTRACT

Disclosed herein is an optical storage device including an optical head having an objective lens for focusing a light beam from a light source onto an optical recording medium accommodated in a cartridge shell, and a photodetector for detecting a regenerative signal from reflected light from the optical recording medium. The optical storage device further includes a cartridge holder having a main surface for holding a cartridge inserted in the optical storage device. First and second cartridge holding assemblies are mounted on the main surface of the cartridge holder in the vicinity of a first side thereof in such a manner as to be spaced from each other and to partially project into the cartridge holder. A third cartridge holding assembly is mounted on the main surface of the cartridge holder in the vicinity of a second side thereof opposite to the first side so as to partially project into the cartridge holder. Each cartridge holding assembly includes a cartridge holding member having a flat surface for holding the cartridge shell.

14 Claims, 18 Drawing Sheets

CARTRIDGE HOLDING MECHANISM FOR OPTICAL STORAGE DEVICE

BACKGROUND OF THE INVENTION

1. Field of the Invention

The present invention relates generally to an optical storage device, and more particularly to a cartridge holding mechanism for an optical storage device.

2. Description of the Related Art

An optical disk has received attention as a memory medium that becomes a core in the recent rapid development of multimedia, and it is usually accommodated in a cartridge case to be provided as an optical disk cartridge for practical use. The optical disk cartridge is loaded into an optical disk drive to perform reading/writing of data (information) from/to the optical disk by means of an optical pickup (optical head). A recent optical disk drive intended to realize size reduction is composed of a fixed optical assembly including a laser diode module, a polarization beam splitter for reflecting and transmitting a laser beam, and a photodetector for receiving reflected light from an optical disk, and a movable optical assembly including a carriage and an optical head having an objective lens and a beam raising mirror mounted on the carriage.

The carriage is movable in the radial direction of the optical disk along a pair of rails by means of a voice coil motor. A write-power laser beam emitted from the laser diode module of the fixed optical assembly is first collimated by a collimator lens, next transmitted by the polarization beam splitter, next reflected by the beam raising mirror of the optical head, and finally focused on the optical disk by the objective lens, thereby writing data onto the optical disk. On the other hand, data reading is performed by directing a read-power laser beam onto the optical disk. Reflected light from the optical disk is first collimated by the objective lens, next reflected by the polarization beam splitter, and finally detected by the photodetector, thereby converting the detected optical signal into an electrical signal.

In general, a cartridge holder is used to hold the optical disk cartridge in the optical disk drive. Further, a spring mechanism as an independent component for firmly holding the cartridge is mounted on the cartridge holder, so as to prevent the play (rattling) of the cartridge in the cartridge holder due to vibration or shock. However, the optical disk is a removable medium, and there are slight variations in size of the cartridge, differences in material of the cartridge, and differences in surface finished condition of the cartridge due to differences in cartridge maker. According to these differences and differences in use frequency (the number of insertions and ejections) of the cartridge, there occur variations in frictional force generated between the cartridge surface and the cartridge holder or another sliding member such as a drive base in the optical disk drive. Accordingly, even in the same optical disk drive, the amount of ejection of the cartridge tends to vary because of such variations in frictional force.

To suppress such variations in the amount of ejection of the cartridge, the conventional cartridge holding mechanism is provided with means for minimizing a change in elastic force of the spring mechanism for holding the cartridge, or provided with a hook mechanism or brake mechanism for stopping or braking the cartridge during ejection. However, such a conventional cartridge holding mechanism employing a spring mechanism as an independent component has a problem of cost increase due to an increase in parts count, an increase in man-hour for parts mounting, and an increase in man-hour for parts managing, for example.

There is a recent trend that a semitransparent cartridge shell (case) is adopted to make the cartridge fashionable. Further, while the conventional cartridge shell is formed of polycarbonate, there is a tendency that the recent cartridge shell is formed of ABS resin lower in hardness than polycarbonate. That is, the hardness of polycarbonate is 120 and the hardness of ABS resin is 103 as measurements by Rockwell ASTMD785, R scale representation.

However, such a semitransparent cartridge shell tends to show noticeable scratches. Further, in the case that the semitransparent cartridge shell is formed of ABS resin lower in hardness than polycarbonate, the scratches becomes more noticeable. Accordingly, in inserting or ejecting an optical disk cartridge having the semitransparent cartridge shell into or from an optical disk drive, the surface of the cartridge shell may be scratched by a mechanism (including springs in many cases) for holding the cartridge, causing a problem that the appearance of the cartridge is deteriorated by the repetition of insertion/ejection of the cartridge with respect to the optical disk drive.

Further, when inserting the optical disk cartridge into the optical disk drive, a shutter of the optical disk cartridge is opened by a shutter opening/closing mechanism including a slider and a torsion spring, thereby exposing an optical disk accommodated in the cartridge shell. In the conventional shutter opening/closing mechanism, an engaging portion between the slider and the torsion spring is spaced apart from a slide portion on which the slider slides, so that a large bending moment is produced in sliding the slider. Accordingly, in the case that burrs or the like are present on the slide portion, a sliding load on the slider increases to cause a possibility that stable insertion/ejection of the cartridge is difficult to obtain.

SUMMARY OF THE INVENTION

It is therefore an object of the present invention to provide a cartridge holding mechanism for an optical storage device which can stably hold a cartridge in the optical storage device and can prevent a cartridge shell from being scratched in inserting or ejecting the cartridge with respect to the optical storage device.

It is another object of the present invention to provide a cartridge holding mechanism for an optical storage device which can obtain a stable frictional force in ejecting a cartridge from the optical storage device.

It is a further object of the present invention to provide a shutter opening/closing mechanism for a cartridge which can effect stable insertion and ejection of the cartridge with respect to an optical storage device.

In accordance with an aspect of the present invention, there is provided a storage device capable of accepting a cartridge including a cartridge shell and a recording medium accommodated in the cartridge shell, and reading information recorded on the recording medium, comprising a cartridge holder having a main surface for holding the cartridge inserted in the storage device, the main surface having first and second openings spaced from each other in the vicinity of a first side of the cartridge holder and a third opening in the vicinity of a second side of the cartridge holder opposite to the first side; and first, second, and third cartridge holding assemblies mounted on the cartridge holder so as to partially project from the first, second, and third openings into the cartridge holder, respectively; each of the first, second, and third cartridge holding assemblies including a cartridge holding member having a flat surface for holding the cartridge shell, a cover fixed to the cartridge holder, and an elastic member interposed between the cartridge holding member and the cover.

The cartridge holding member and the elastic member may be integrally formed from a leaf spring. Preferably, the flat surface of the cartridge holding member has a reduced surface roughness provided by surface treatment.

In accordance with another aspect of the present invention, there is provided a cartridge holding mechanism for a storage device, comprising a base; a cartridge holder having a main surface for holding a recording medium cartridge inserted in the storage device in cooperation with the base, the main surface having first and second openings spaced from each other in the vicinity of a first side of the cartridge holder and a third opening in the vicinity of a second side of the cartridge holder opposite to the first side; and first, second, and third cartridge holding assemblies mounted on the cartridge holder so as to partially project from the first, second, and third openings into the cartridge holder, respectively; each of the first, second, and third cartridge holding assemblies comprising a cartridge holding member having a flat surface for holding the recording medium cartridge, a cover fixed to the cartridge holder, and an elastic member interposed between the cartridge holding member and the cover.

In accordance with a further aspect of the present invention, there is provided a storage device capable of accepting a cartridge including a cartridge shell and a recording medium accommodated in the cartridge shell, and reading information recorded on the recording medium, comprising a cartridge holder having a main surface for holding the cartridge inserted in the storage device, the main surface having first and second openings spaced from each other in the vicinity of a first side of the cartridge holder and a third opening in the vicinity of a second side of the cartridge holder opposite to the first side; a first spring arm having a first portion extending over the first opening, a second portion extending over the second opening, and an intermediate portion extending between the first portion and the second portion, the first spring arm being fixed to the cartridge holder at the intermediate portion so as to extend substantially in parallel to the first side of the cartridge holder; and a second spring arm extending over the third opening substantially in parallel to the second side of the cartridge holder, the second spring arm being fixed at one end portion thereof to the cartridge holder; the first and second portions of the first spring arm having first and second projecting portions, respectively, the second spring arm having a third projecting portion at the other end portion; each of the first, second, and third projecting portions having a flat surface for holding the cartridge shell.

Preferably, the first and second projecting portions are integral with the first spring arm, and the third projecting portion is integral with the second spring arm. The flat surface of each projecting portion has a reduced surface roughness provided by surface treatment.

In accordance with a still further aspect of the present invention, there is provided a cartridge holding mechanism for a storage device, comprising a base; a cartridge holder having a main surface for holding a recording medium cartridge inserted in the storage device in cooperation with the base, the main surface having first and second openings spaced from each other in the vicinity of a first side of the cartridge holder and a third opening in the vicinity of a second side of the cartridge holder opposite to the first side; a first spring arm having a first portion extending over the first opening, a second portion extending over the second opening, and an intermediate portion extending between the first portion and the second portion, the first spring arm being fixed to the cartridge holder at the intermediate portion so as to extend substantially in parallel to the first side of the cartridge holder; and a second spring arm extending over the third opening substantially in parallel to the second side of the cartridge holder, the second spring arm being fixed at one end portion thereof to the cartridge holder; the first and second portions of the first spring arm having first and second projecting portions, respectively, the second spring arm having a third projecting portion at the other end portion; each of the first, second, and third projecting portions having a flat surface for holding the cartridge.

In accordance with a still further aspect of the present invention, there is provided a storage device capable of accepting a cartridge including a cartridge shell and a recording medium accommodated in the cartridge shell, and reading information recorded on the recording medium, comprising a cartridge holder having a main surface for holding the cartridge inserted in the storage device, the main surface having a guide groove having a first portion inclined with respect to a side edge of the cartridge holder and a second portion parallel to the side edge of the cartridge holder; first and second sliders slidably fitted with the guide groove; a first spring having one end engaged with the first slider and the other end engaged with the second slider; and a second spring having one end engaged with the second slider and the other end engaged with the cartridge holder; the first slider being biased by the first and second springs in a direction of ejecting the cartridge inserted in the cartridge holder; an engaging portion between the first slider and the first spring being formed at substantially the same level as that of a slide portion on which the first slider slides.

In accordance with a still further aspect of the present invention, there is provided a shutter opening/closing mechanism for a cartridge having a shutter, comprising a cartridge holder having a main surface for holding the cartridge inserted in a storage device, the main surface having a guide groove having a first portion inclined with respect to a side edge of the cartridge holder and a second portion parallel to the side edge of the cartridge holder; first and second sliders slidably fitted with the guide groove; a first spring having one end engaged with the first slider and the other end engaged with the second slider; and a second spring having one end engaged with the second slider and the other end engaged with the cartridge holder; the first slider being biased by the first and second springs in a direction of ejecting the cartridge inserted in the cartridge holder; an engaging portion between the first slider and the first spring being formed at substantially the same level as that of a slide portion on which the first slider slides.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
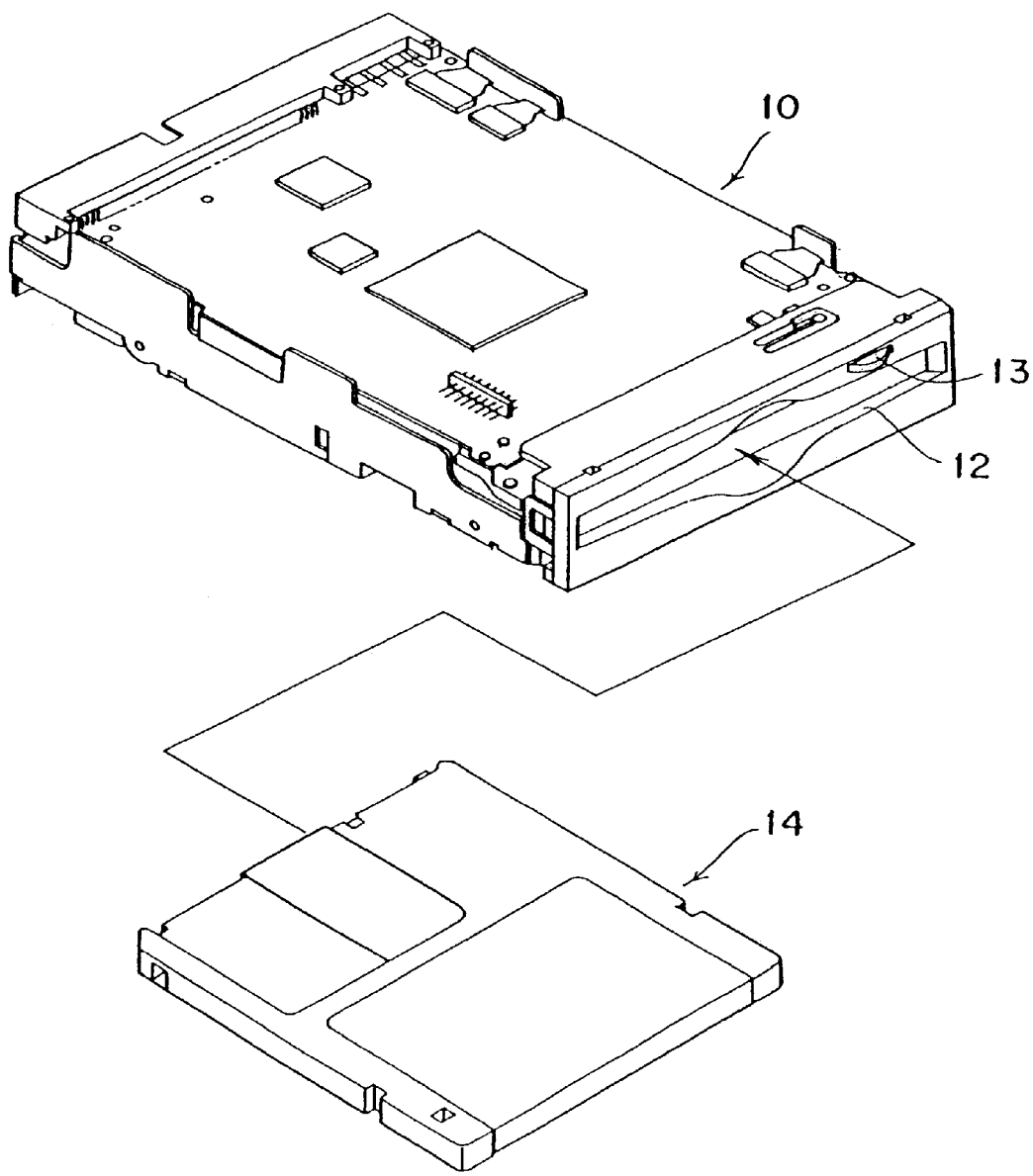
FIG. 1 is an upper perspective view of a magneto-optical disk drive including a cartridge holding mechanism according to the present invention.
Figure 2:
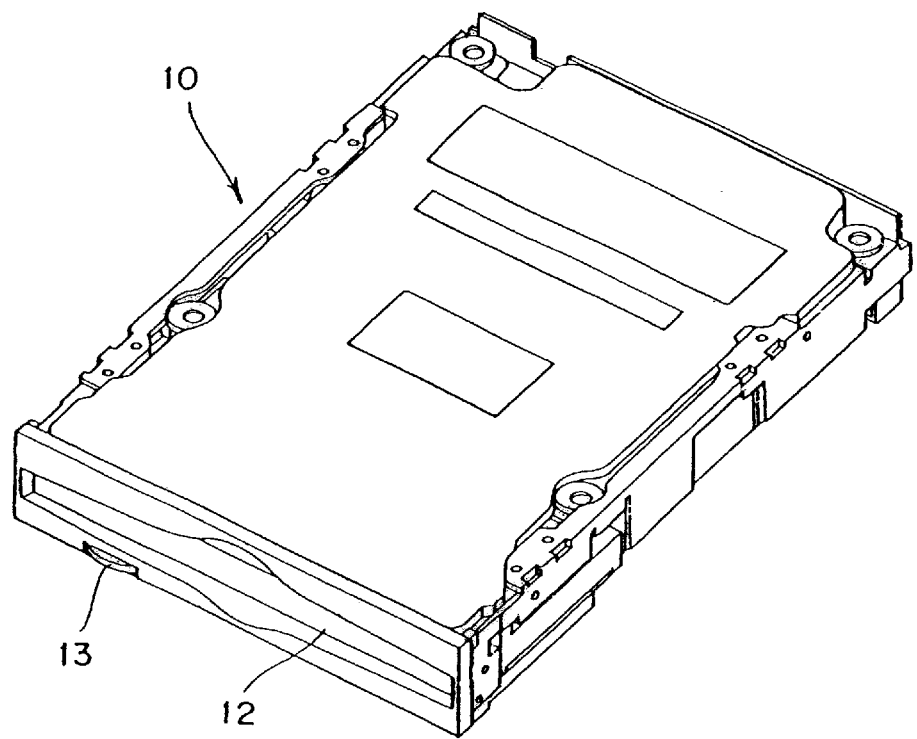
FIG. 2 is a lower perspective view of the magneto-optical disk drive.

Referring to FIG. 1, there is shown a perspective view of a magneto-optical disk drive 10 to which the present invention is applied, as viewed from the upper side. FIG. 2 is a perspective view of the magneto-optical disk drive 10 as viewed from the lower side. The magneto-optical disk drive 10 accepts a magneto-optical disk cartridge 14 having a cartridge shell and a magneto-optical disk (both will be hereinafter described) accommodated in the cartridge shell, and performs reading/writing of data from/to the magneto-optical disk in the magneto-optical disk cartridge 14. Reference numeral 13 denotes an eject button for ejecting the magneto-optical disk cartridge 14 out of the magneto-optical disk drive 10.

As will be hereinafter described in detail, the magneto-optical disk drive 10 includes a load/eject mechanism for the magneto-optical disk cartridge 14, a spindle motor for rotating the magneto-optical disk, a bias magnetic field generating mechanism, a positioner, a fixed optical assembly, and a movable optical assembly. The magneto-optical disk drive 10 further has an insert opening 12 for accepting the magneto-optical disk cartridge 14.

Figure 3A:
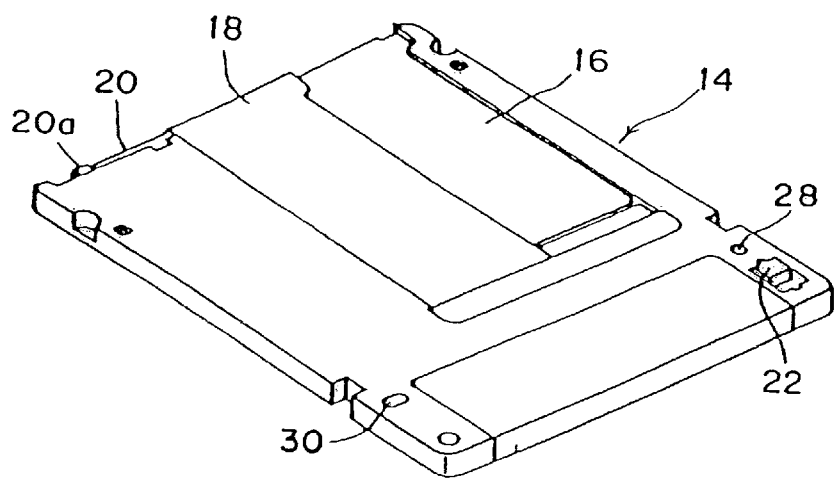
FIG. 3A is a perspective view of a magneto-optical disk cartridge in a shutter closed condition.
Figure 3B:
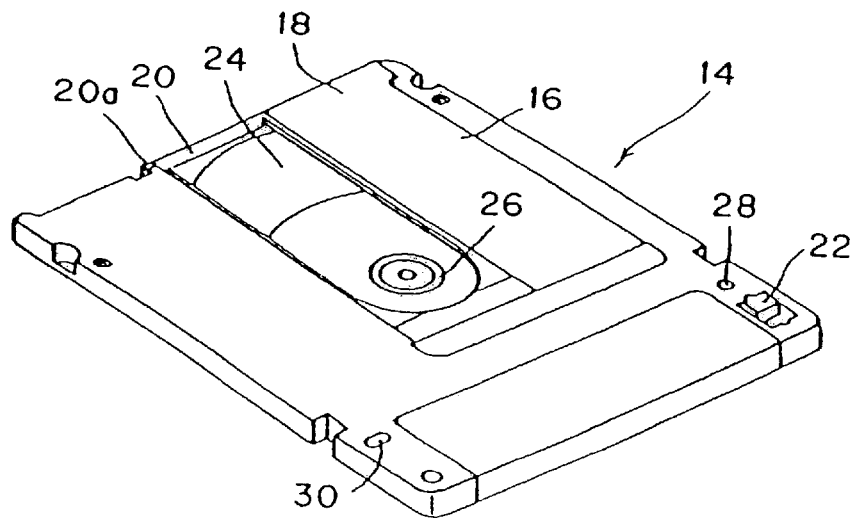
FIG. 3B is a perspective view of the magneto-optical disk cartridge in a shutter open condition.

FIGS. 3A and 3B are perspective views of the magneto-optical disk cartridge 14 in its different conditions, as viewed from the lower side. It should be noted that FIG. 1 shows the upper side of the magneto-optical disk cartridge 14. As shown in FIG. 3A, the magneto-optical disk cartridge 14 has a cartridge shell (case) 16. The cartridge shell 16 is provided with a slidable shutter 18. A shutter opening arm 20 is mounted at a front end portion of the shutter 18. A write protector 22 for prohibiting writing onto a magneto-optical disk is provided at a rear end portion of the cartridge shell 16.

When an end portion 20a of the shutter opening arm 20 is pushed by a slider to be hereinafter described, the shutter 18 is slid on the cartridge shell 16. FIG. 3B shows a condition where the shutter 18 is fully open. As shown in FIG. 3B, a magneto-optical disk 24 as a data recording medium is rotatably accommodated in the cartridge shell 16. The magneto-optical disk 24 has a central hub 26 adapted to be chucked for rotation by a spindle motor to be hereinafter described. Two reference holes 28 and 30 for positioning the magneto-optical disk cartridge 14 in the magneto-optical disk drive 10 are formed near the opposite side edges at the rear end portion of the cartridge case 16. The reference hole 28 is a round hole, and the reference hole 30 is an elongated hole.

Figure 4:
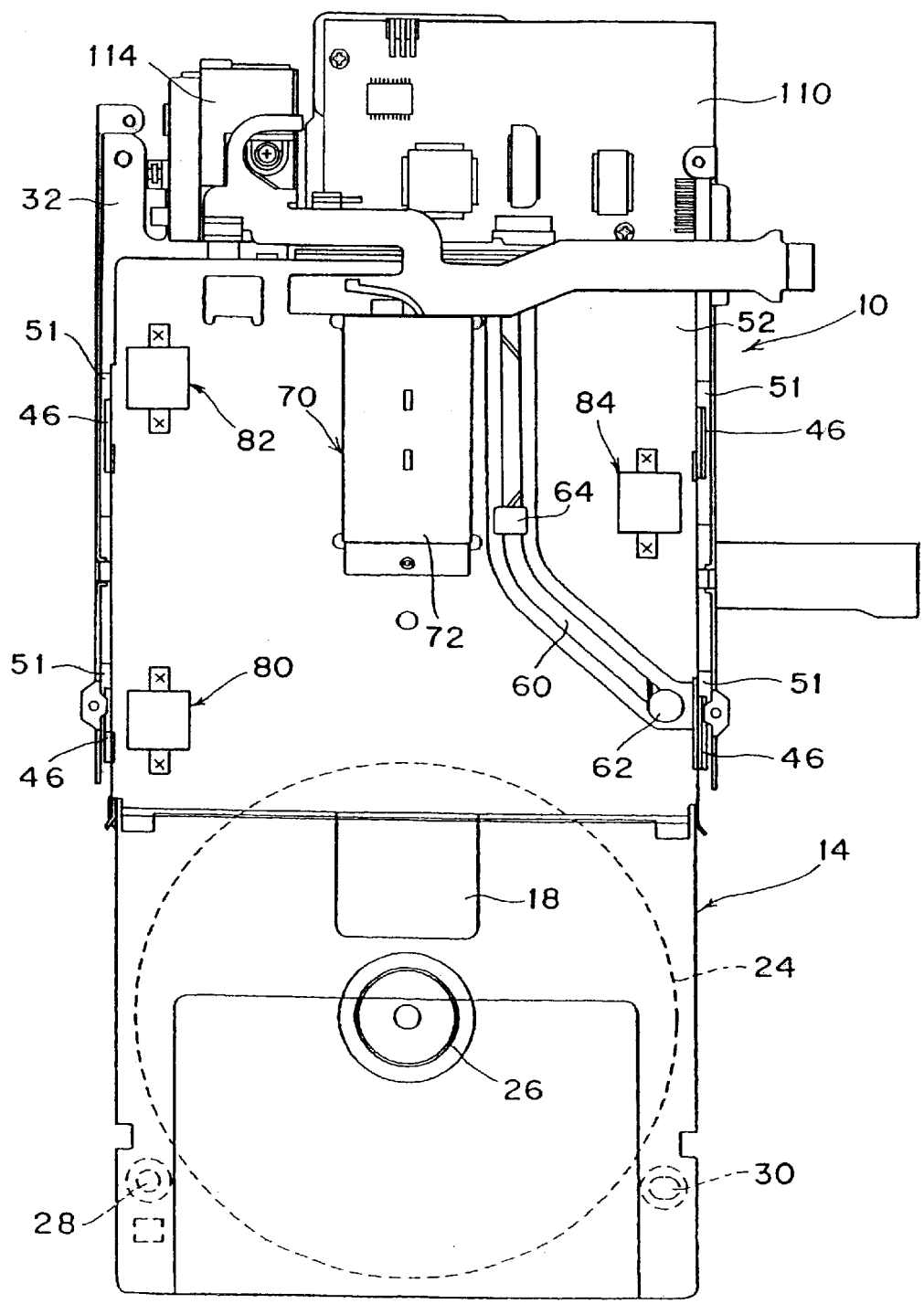
FIG. 4 is a top plan view of the magneto-optical disk drive in the condition where the magneto-optical disk cartridge is slightly inserted in the magneto-optical disk drive or the cartridge is ejected from the magneto-optical disk drive.
Figure 5:
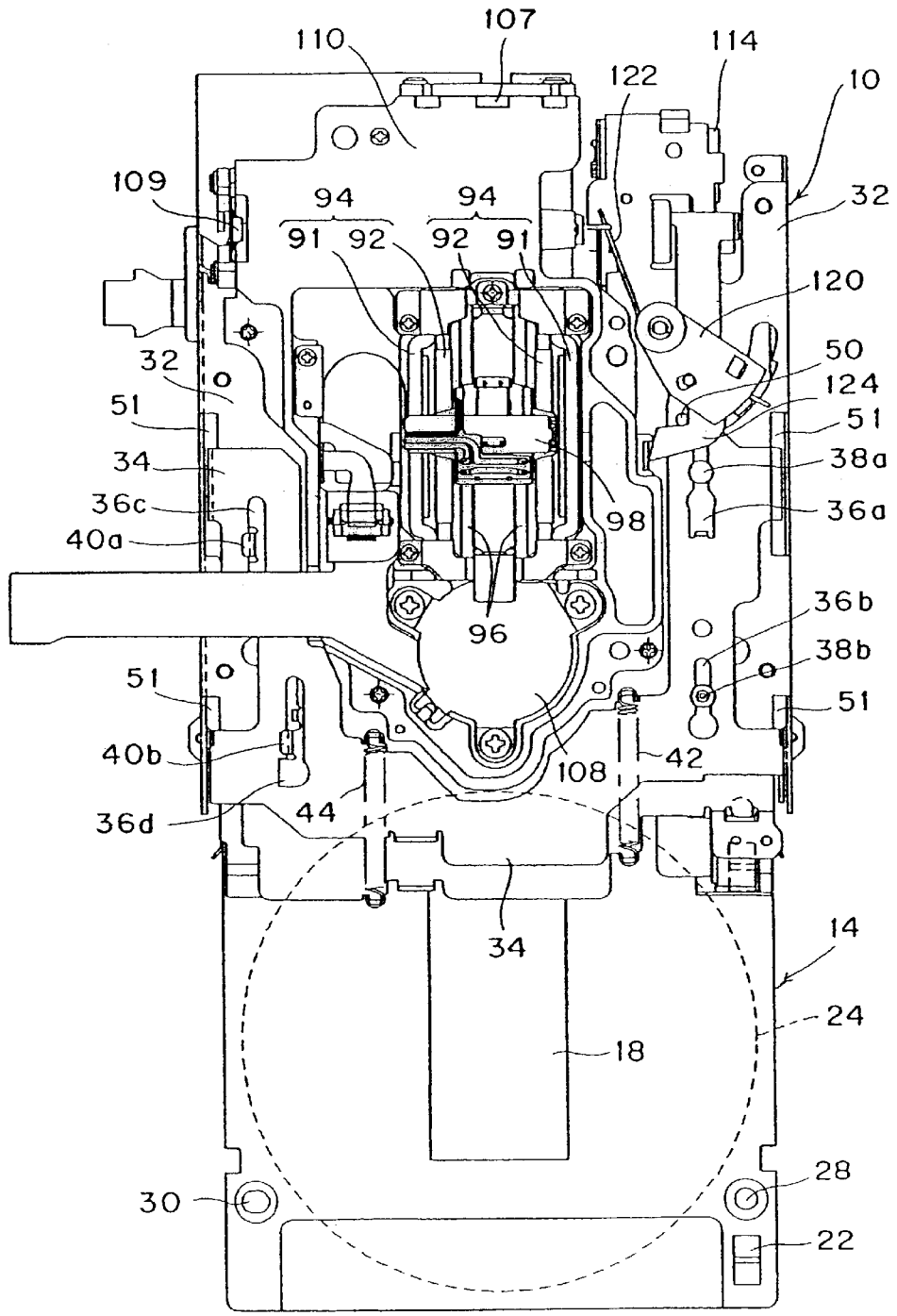
FIG. 5 is a back side view of FIG. 4.
Figure 6:
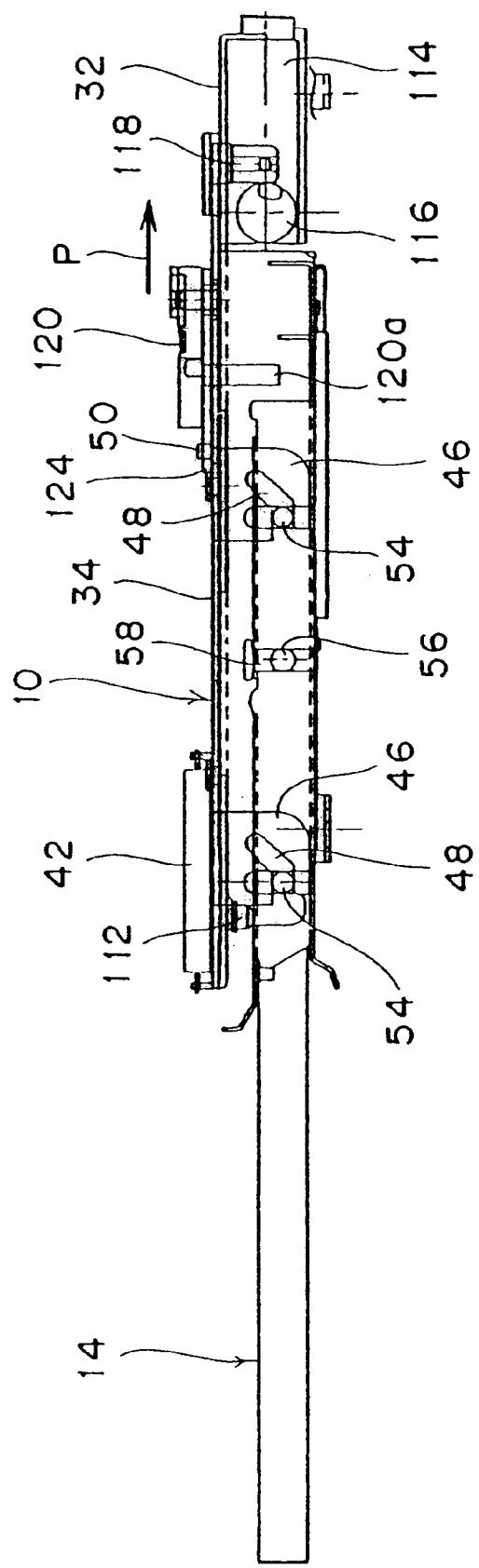
FIG. 6 is a right side view of FIG. 5.

FIG. 4 is a top plan view showing a condition where the magneto-optical disk cartridge 14 is slightly inserted in the magneto-optical disk drive 10 from the insert opening 12. FIG. 5 is a bottom plan view showing the same condition as that of FIG. 4, and FIG. 6 is a right side view of FIG. 5. As best shown in FIG. 5, a load plate 34 is movably mounted on a drive base 32. The load plate 34 has four elongated holes 36a, 36b, 36c, and 36d. Two pins 38a and 38b and two engaging projections 40a and 40b are fixed to the drive base 32. The pins 38a and 38b are inserted in the elongated holes 36a and 36b, respectively, and the engaging projections 40a and 40b are inserted in the elongated holes 36c and 36d, respectively. With this structure, the load plate 34 is movable in the longitudinal direction of the base 32 as being guided by the pins 38a and 38b and the engaging projections 40a and 40b.

Two openings 51 are formed on each side portion of the base 32. On the other hand, the load plate 34 is integrally formed with four lift guides 46 bent about 90° from the horizontal surface. The four lift guides 46 of the load plate 34 are respectively inserted through the four openings 51 of the base 32 so as to project from the lower side of the base 32 to the upper side thereof (see FIG. 4). Further, a pin 50 is fixed to the base 32. As shown in FIG. 6, each lift guide 46 has a slot 48 consisting of a horizontal portion and an inclined portion.

There will now be described the structure of a cartridge holder 52 according to a preferred embodiment of the present invention with reference to FIGS. 8 to 10. Two pins 54 and a pin 56 are fixed to each side portion of the cartridge holder 52. The cartridge holder 52 is formed with a guide groove 60. The guide groove 60 is composed of a first portion obliquely extending from one end of the insert opening 12 laterally inward of the cartridge holder 52 and a second portion extending from an inward end of the first portion to the rear end of the cartridge holder 52 in parallel to the longitudinal direction of the cartridge holder 52.

A first slider 62 and a second slider 64 are slidably engaged with the guide groove 60. The first slider 62 and the second slider 64 are formed of resin such as triacetal. As shown in FIG. 10, the first slider 62 and the second slider 64 are connected by a torsion spring 66, and a torsion spring 68 is interposed between the second slider 64 and the cartridge holder 52 so as to normally bias the second slider 64 toward the front end of the cartridge holder 52.

The opposite edge portions of the guide groove 60 are formed as slide portions 61 on which the sliders 62 and 64 slide. The slide portions 61 are formed by drawing the cartridge holder 52 so that the surface of the cartridge holder 52 as viewed in FIG. 10 is slightly lowered. Accordingly, the slide portions 61 extending along the guide groove 60 are slightly raised as viewed in FIG. 8. A bias magnetic field generating mechanism 70 is mounted on the cartridge holder 52. The bias magnetic field generating mechanism 70 includes a back yoke 72, a center yoke 74 mounted on the back yoke 72, and a coil 76. The cartridge holder 52 and the back yoke 72 are formed from a steel plate, for example.

Figure 10:
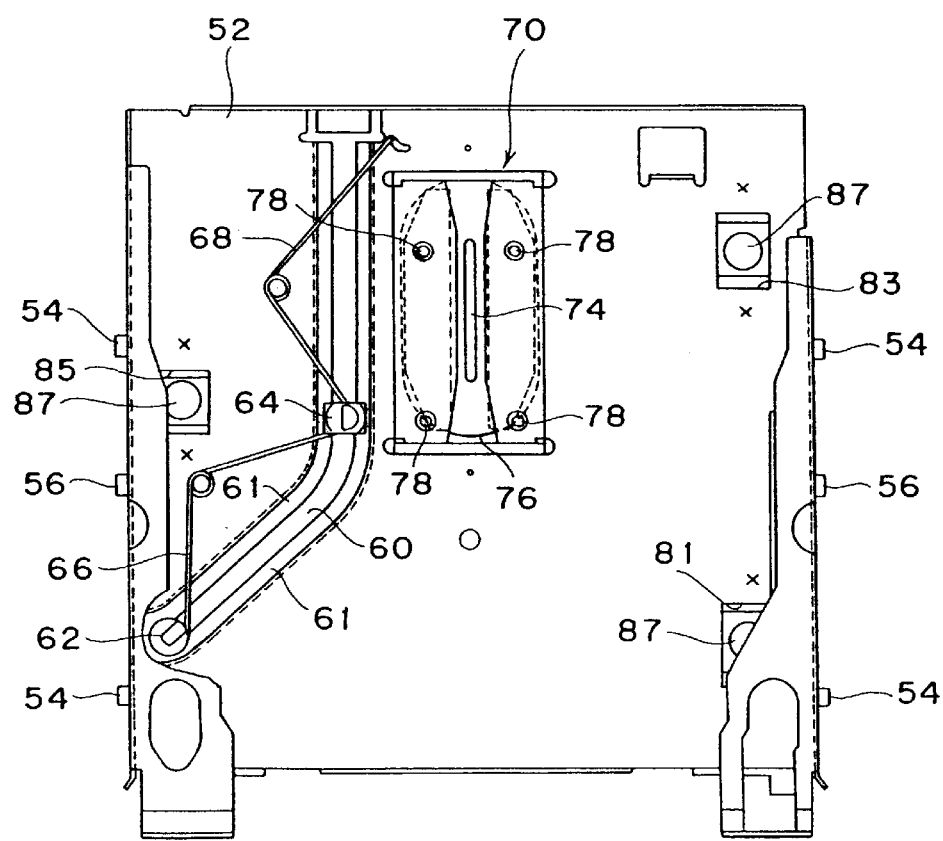
FIG. 10 is a back side view of FIG. 8.

As shown in FIG. 10, four flattened projections 78 are formed on a portion of the cartridge holder 52 where the bias magnetic field generating mechanism 70 is located, in order to prevent the magneto-optical disk cartridge 14 inserted in the magneto-optical disk drive 10 from colliding with the cartridge holder 52 and/or the center yoke 74. A first opening 81 and a second opening 83 are formed through the cartridge holder 52 in the vicinity of a first side thereof. The first and second openings 81 and 83 are spaced a given distance from each other. A third opening 85 is formed through the cartridge holder 52 in the vicinity of a second side thereof opposite to the first side.

Figure 8:
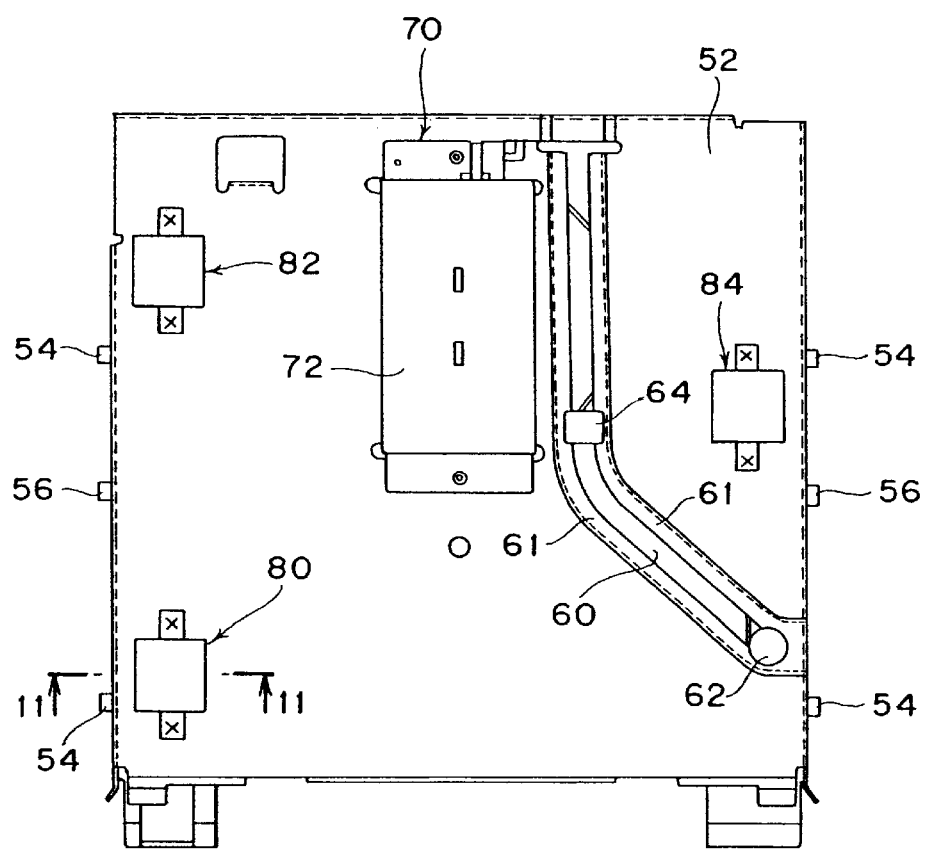
FIG. 8 is a top plan view of a cartridge holder.
Figure 9:
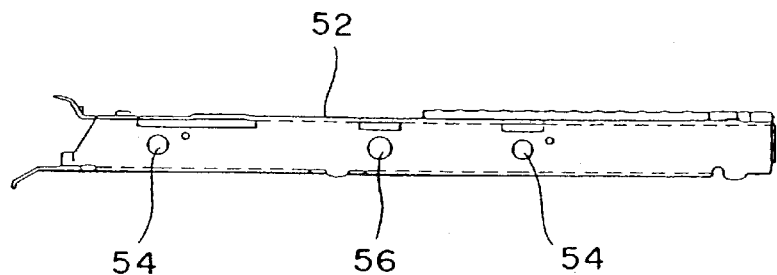
FIG. 9 is a right side view of FIG. 8.
Figure 11:
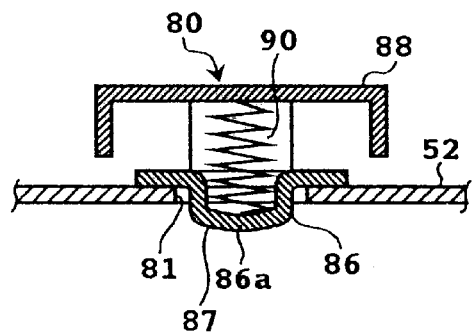
FIG. 11 is a cross section taken along the line 11—11 in FIG. 8.

As shown in FIGS. 8 and 11, a first cartridge holding assembly 80 is mounted on the cartridge holder 52 so as to partially project from the first opening 81 into the cartridge holder 52. Similarly, a second cartridge holding assembly 82 is mounted on the cartridge holder 52 so as to partially project from the second opening 83 into the cartridge holder 52. Similarly, a third cartridge holding assembly 84 is mounted on the cartridge holder 52 so as to partially project from the third opening 85 into the cartridge holder 52.

Figure 12A:
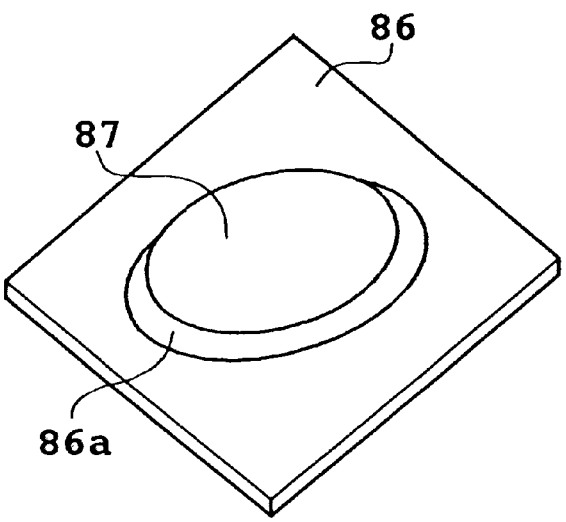
FIG. 12A is a perspective view of a cartridge holding member shown in FIG. 11.

The first, second, and third cartridge holding assemblies 80, 82, and 84 have the same configuration, and so the first cartridge holding assembly 80 only will now be described as a representative. As shown in FIG. 11, the first cartridge holding assembly 80 includes a cartridge holding member 86 having a projecting portion 86a, a cover 88 fixed to the cartridge holder 52 by spot welding, and an elastic member 90 such as a coil spring interposed between the cartridge holding member 86 and the cover 88. The cartridge holding member 86 and the cover 88 are formed from a stainless steel sheet or a galvanized steel sheet, for example. As best shown in FIG. 12A, the projecting portion 86a of the cartridge holding member 86 has a flat surface 87 adapted to come into contact with the cartridge shell 16.

It is now assumed that the cartridge shell 16 is formed of ABS resin and that it is semitransparent. Then, the conditions for preventing the cartridge shell 16 from being scratched will now be obtained. It is assumed that the weight of the cartridge 14 is about 30 g in general and that the shock resistance required in operating the cartridge 14, that is, in inserting or ejecting the cartridge 14 into or from the disk drive 10 is 10 G (design value). Under these conditions, the cartridge holding force required to prevent the play of the cartridge 14 in the operation becomes equal to or greater than 300 gf, or 2.94 newtons (N). In the case of applying this required holding force to the cartridge 14 at three points, a cartridge holding force of 100 gf (0.98 N) is required at each point.

If the cartridge holding member 86 has a contact portion coming into point contact with the surface of the cartridge 14, a cartridge holding force of 100 gf (0.98 N) or more is applied to the surface of the cartridge 14, causing scratches on the surface of the cartridge shell 16. However, since the contact portion of the cartridge holding member 86 is formed as the flat surface 87 in this preferred embodiment, the cartridge holding force applied to the cartridge 14 can be dispersed.

Assuming that the area of the flat surface 87 is 10 mm$^2$, for example, the cartridge holding force applied to the surface of the cartridge 14 is dispersed to become 10 gf/mm$^2$ (0.098 N/mm$^2$), thereby preventing scratches on the surface of the cartridge shell 16. From the viewpoint of working, it is difficult to provide a so large area for the flat surface 87, and so the area of the flat surface 87 is preferably set in the range of about 5 mm$^2$ to about 30 mm$^2$.

Further, the relation between the surface roughness of the flat surface 87 and the cartridge holding force will now be examined. It is assumed that the flat surface 87 has an area of about 10 mm$^2$. The condition of the surface of the cartridge shell 16 was evaluated visually by changing the cartridge holding force and the surface roughness of the flat surface 87. The result of this evaluation is shown in Table 1.

TABLE 1

|  |  | Surface Roughness (Rz) ($\mu$m) | |  |
|---|---|---|---|---|
|  |  | 0.4071 | 0.9677 | 1.2342 |
| Holding Force (N/mm$^2$) | 0.098 | ○ | Δ | X |
|  | 0.196 | Δ | X | X |
|  | 0.294 | X | X | X |

* [Evaluation]
○: Not scratched; Δ: Slightly scratched; X: Scratched

Figure 12B:
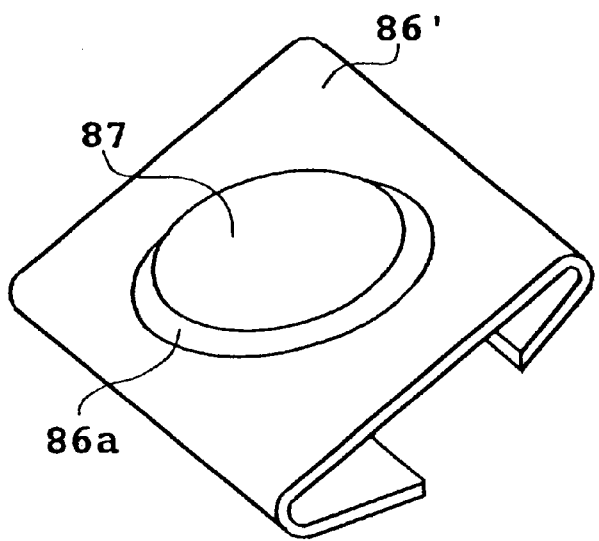
FIG. 12B is a perspective view showing a modification of the cartridge holding member.

As apparent from Table 1, the surface of the cartridge shell 16 can be less scratched by suppressing the holding force per unit area and reducing the surface roughness of the flat surface 87 of the cartridge holding member 86. FIG. 12B shows a modification of the cartridge holding member 86. In this modification, a cartridge holding member 86' formed from a leaf spring is adopted to eliminate the need for any independent elastic member. That is, the cartridge holding member and the elastic member can be integrated.

Figure 13:
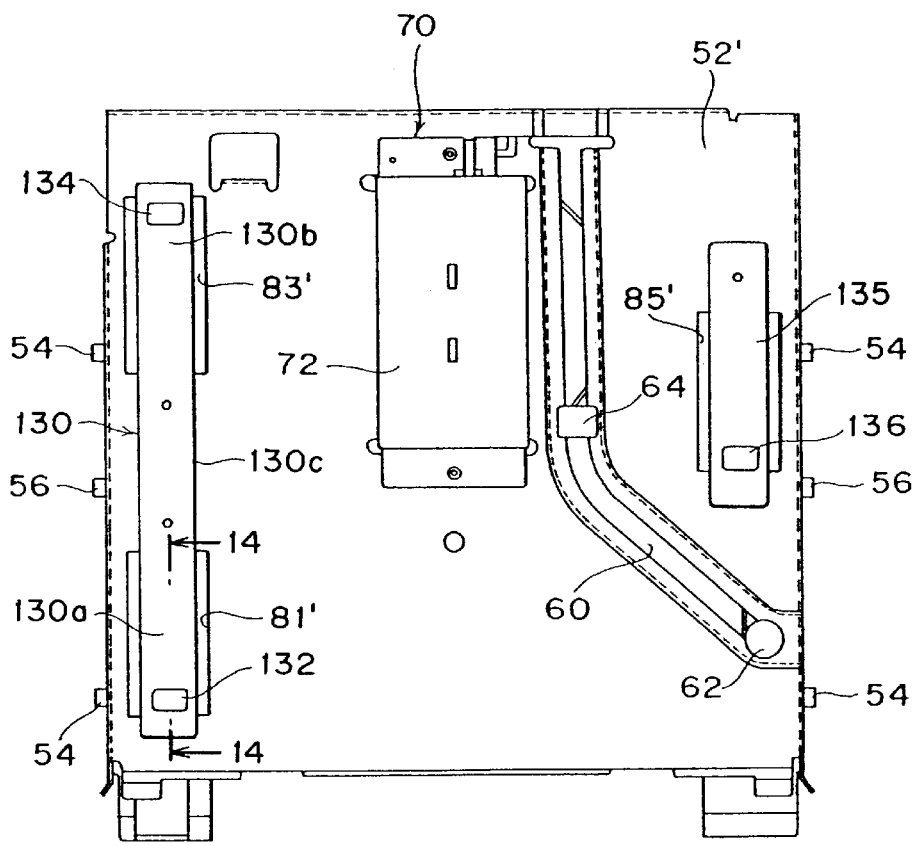
FIG. 13 is a top plan view showing another preferred embodiment of the cartridge holder.

Referring to FIG. 13, there is shown a top plan view of a cartridge holder 52' according to another preferred embodiment of the present invention. A first opening 81' and a second opening 83' are formed through the cartridge holder 52' in the vicinity of a first side thereof so as to be spaced a given distance from each other. A third opening 85' is formed through the cartridge holder 52' in the vicinity of a second side thereof opposite to the first side. Reference numeral 130 denotes a first spring arm, which has a first portion 130a extending over the first opening 81', a second portion 130b extending over the second opening 83', and an intermediate portion 130c extending between the first and second portions 130a and 130b.

Figure 14:
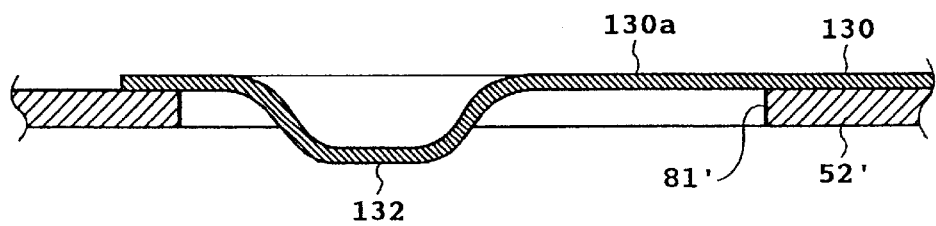
FIG. 14 is a cross section taken along the line 14—14 in FIG. 13.

The first spring arm 130 is fixed to the cartridge holder 52' by spot welding or the like at the intermediate portion 130c so as to extend substantially parallel to the first side of the cartridge holder 52'. As best shown in FIG. 14, the first portion 130a is formed at its front end portion with a projecting portion 132 by drawing. The projecting portion 132 projects from the first opening 81' into the cartridge holder 52'. Similarly, the second portion 130b is formed at its front end portion with a projecting portion 134 by drawing. In modification, the first spring arm 130 may be divided into two parts, and each part may be fixed to the cartridge holder 52' by spot welding.

Similarly, a second spring arm 135 is fixed at one end portion thereof to the cartridge holder 52' by spot welding or the like, and extends over the third opening 85' in parallel to the second side of the cartridge holder 52'. The second spring arm 135 is formed at its front end portion with a projecting portion 136 by drawing.

Figure 15A:
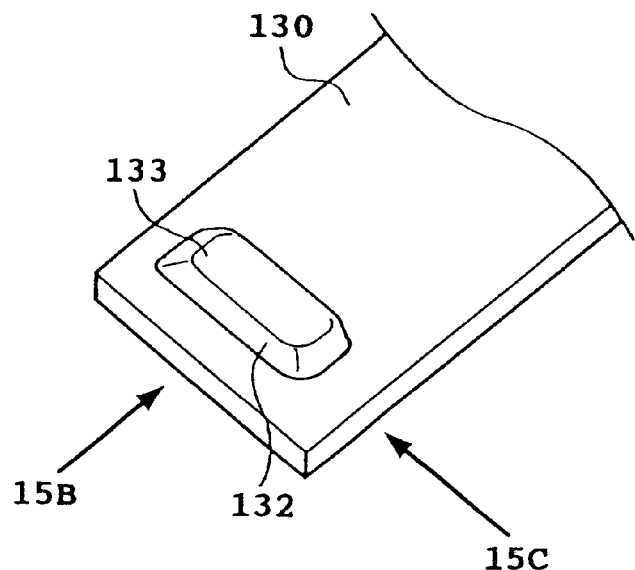
FIG. 15A is a fragmentary perspective view of a first spring arm shown in FIG. 13.
Figure 15B:
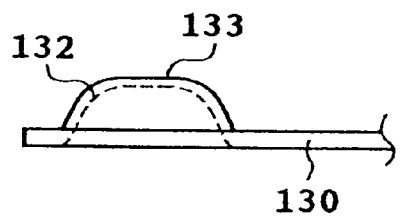
FIG. 15B is a view taken in the direction of an arrow 15B shown in FIG. 15A.
Figure 15C:
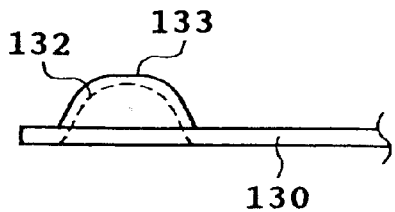
FIG. 15C is a view taken in the direction of an arrow 15C shown in FIG. 15A.

As shown in FIGS. 15A to 15C, the projecting portion 132 of the first spring arm 130 has a flat surface 133. The area of the flat surface 133 is preferably set in the range of about 5 mm² to about 30 mm². Each of the other projecting portions 134 and 136 has a similar flat surface having an area set preferably in the range of about 5 mm² to about 30 mm². Furthermore, each flat surface is preferably subjected to surface treatment such as chromium plating for reducing the surface roughness. Instead of chromium plating, each flat surface may be subjected to electrolytic polishing.

According to the cartridge holder 52' of this preferred embodiment, the projecting portions 132, 134, and 136 have the respective flat surfaces for holding the cartridge shell 16. Accordingly, in inserting or ejecting the cartridge 14 into or from the disk drive according to this preferred embodiment, a stable frictional force can be obtained and the cartridge shell 16 can be prevented from being scratched.

Figure 16A:
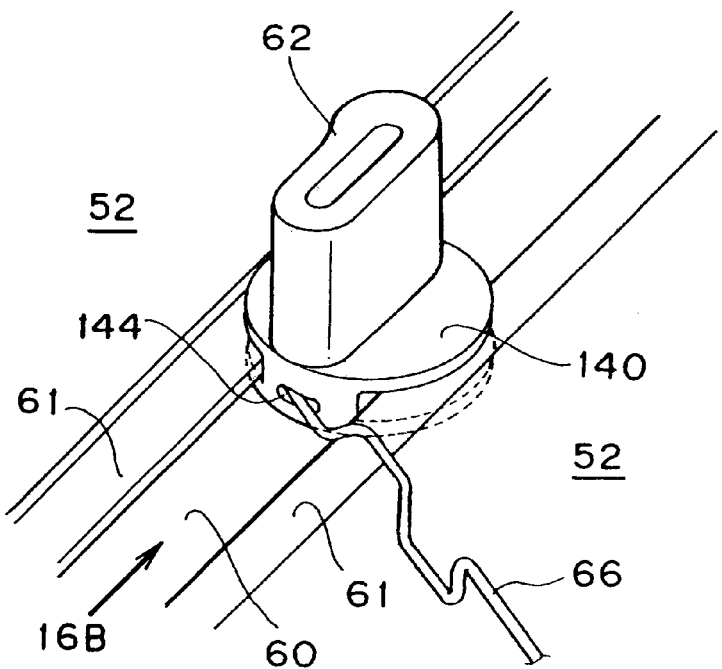
FIG. 16A is a perspective view showing a structure of engagement between a first slider and a first torsion spring.
Figure 16B:
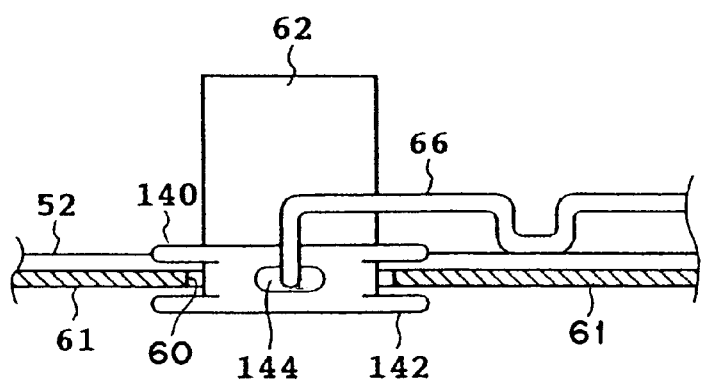
FIG. 16B is a view taken in the direction of an arrow 16B shown in FIG. 16A with slide portions being shown in cross section.

A structure of engagement between the first slider 62 and the first torsion spring 66 will now be described with reference to FIGS. 16A and 16B. The first slider 62 has a pair of flanges 140 and 142. The first slider 62 is slidably fitted with the guide groove 60 in such a manner that the slide portions 61 are interposed between the flanges 140 and 142. The first slider 62 has an engaging hole 144 at substantially same level as that of the slide portions 61, and one end of the first torsion spring 66 is engaged with the engaging hole 144.

Thus, the engaging hole 144 of the first slider 62 as an engaging portion for engaging the first torsion spring 66 is formed at substantially the same level as that of the slide portions 61 of the cartridge holder 52 on which the first slider 62 slides, so that a bending moment by the first torsion spring 66 in sliding the first slider 62 becomes almost zero. Accordingly, even in the case that burrs or the like are present on the slide portions 61 for the first slider 62, a sliding load on the first slider 62 is not so increased to allow stable insertion and ejection of the cartridge 14.

Figure 17A:
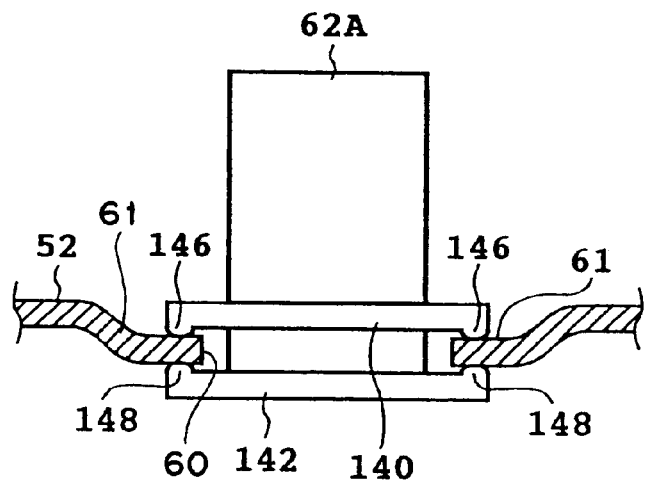
FIGS. 17A and 17B are views similar to FIG. 16B, showing other preferred embodiments of the first slider.
Figure 17B:
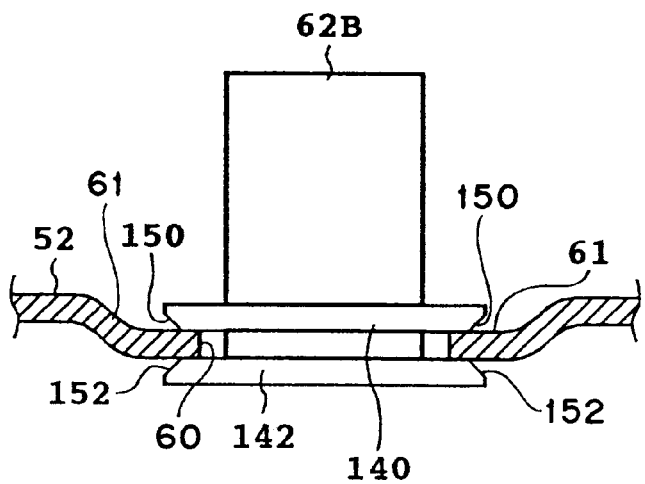

FIGS. 17A and 17B show modifications of the first slider 62. The modification shown in FIG. 17A is a first slider 62A having a pair of flanges 140 and 142. The flange 140 is integrally formed with a plurality of projections 146 kept in contact with the upper surfaces of the slide portions 61. Similarly, the flange 142 is integrally formed with a plurality of projections 148 kept in contact with the lower surfaces of the slide portions 61. Accordingly, a sliding load in sliding the first slider 62A can be reduced. The modification shown in FIG. 17B is a first slider 62B having a pair of flanges 140 and 142 respectively formed with inclined surfaces 150 and 152. Accordingly, a sliding load in sliding the first slider 62B can be reduced.

Figure 18:
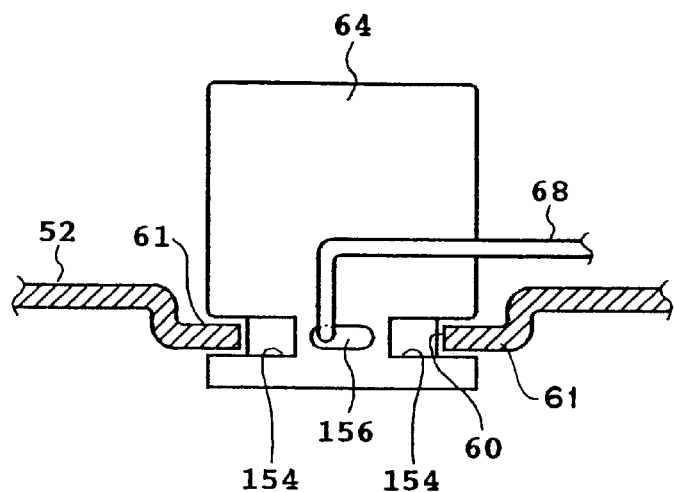
FIG. 18 is a view similar to FIG. 16B, showing a structure of engagement between a second slider and a second torsion spring.

Referring to FIG. 18, there is shown a structure of engagement between the second slider 64 and the second torsion spring 68. The second slider 64 has a pair of recesses 154. The second slider 64 is slidably fitted with the guide groove 60 in such a manner that the slide portions 61 are inserted in the recesses 154. The second slider 64 has an engaging hole 156 formed at substantially the same level as that of the slide portions 61, and one end of the second torsion spring 68 is engaged with the engaging hole 156. Although not especially shown, an engaging portion between the second slider 64 and the first torsion spring 66 is also formed at substantially the same level as that of the slide portions 61. Accordingly, a bending moment by the first and second torsion springs 66 and 68 in sliding the second slider 64 becomes almost zero, thereby reducing a sliding load on the second slider 64.

Figure 19:
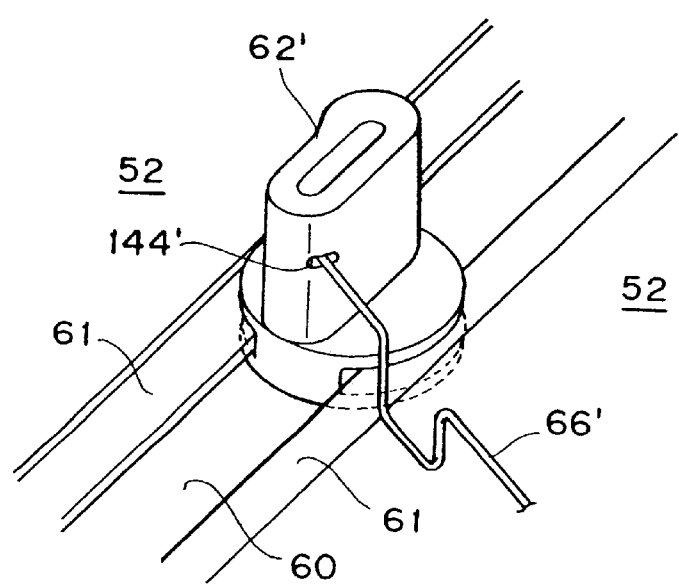
FIG. 19 is a perspective view showing a comparison of the engagement structure of the first slider and the first torsion spring.

FIG. 19 shows a structure of engagement between a first slider 62' and a first torsion spring 66' as a comparison. In this comparison, the first slider 62' has an engaging hole 144' formed at a level higher by about 4.1 mm than the level of the slide portions 61. Assuming that the force at the point of action by the first torsion spring 66' is 6 gf (0.059 N), a bending moment M of 25 gf·mm (0.246 N·mm) is produced in the first slider 62'. This bending moment M causes inclination of the first slider 62' in sliding on the slide portions 61. Accordingly, in the case that burrs or the like are present on the slide portions 61, a sliding load on the first slider 62' increases to hinder stable insertion and ejection of the cartridge 14.

In contrast to this comparison, the structure of engagement between the first slider 62 and the first torsion spring 66 according to this preferred embodiment can eliminate the above problem, because the engaging portion 144 and the slide portions 61 are set substantially the same level. Accordingly, the bending moment by the first torsion spring 66 can be almost neglected to thereby reduce the sliding load.

The cartridge holder 52 having the above structure is mounted on the load plate 34 in such a manner that the four pins 54 of the cartridge holder 52 are respectively inserted in the slots 48 of the four lift guides 46 of the load plate 34, and that the two pins 56 of the cartridge holder 52 are respectively inserted in two guide slots 58 formed at the opposite side portions of the base 32. FIG. 6 shows a condition where only a front end portion of the cartridge 14 is inserted in the cartridge holder 52. In this condition, the pins 54 are respectively located in the horizontal portions of the slots 48 of the lift guides 46.

Figure 7:
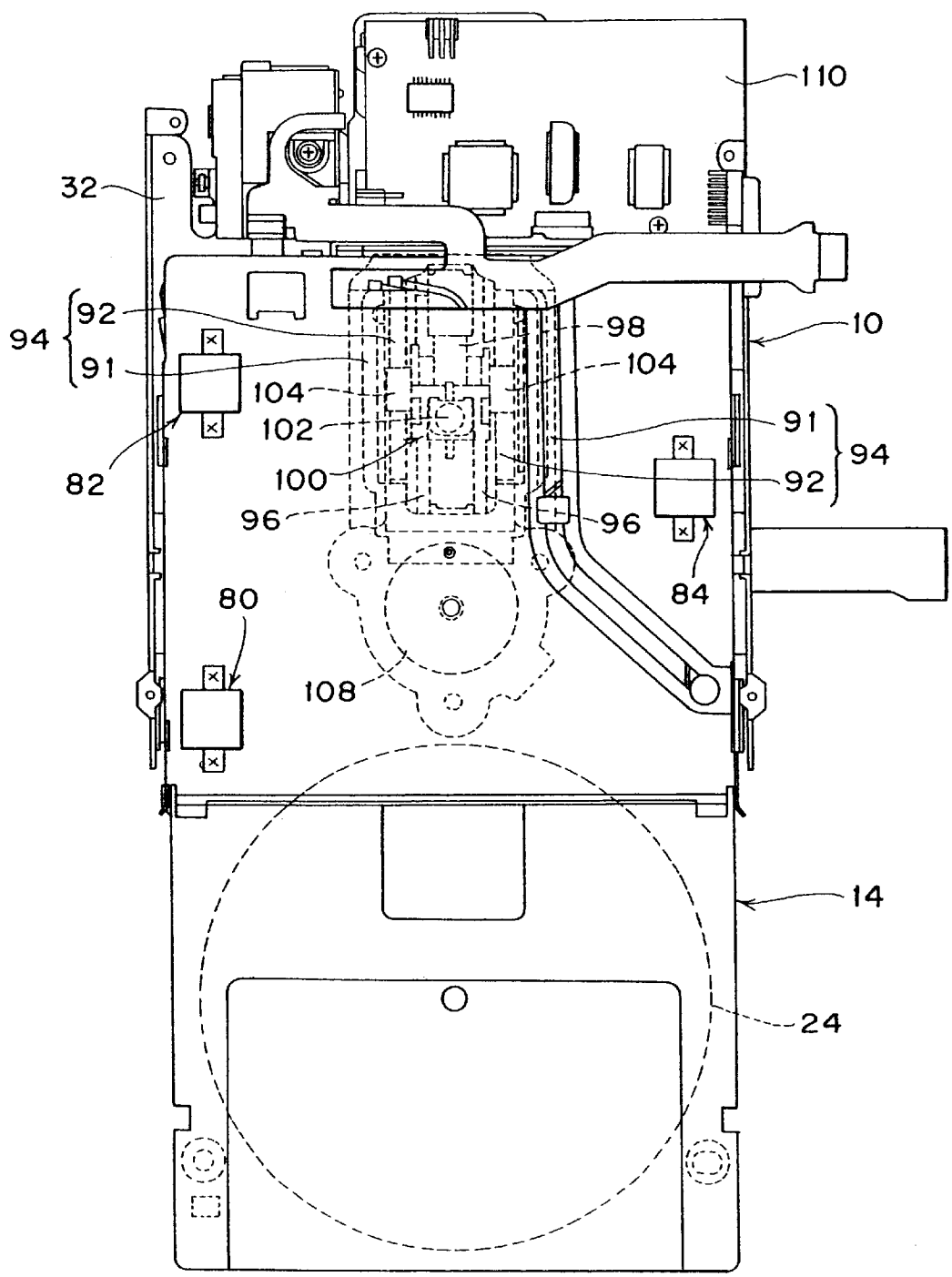
FIG. 7 is a view similar to FIG. 4 with magnetic circuits, a carriage, and an optical head shown by broken lines.

As shown in FIGS. 5 and 7, a pair of magnetic circuits 94 and a pair of guide rails 96 are mounted on the drive base 32. Each magnetic circuit 94 consists of a permanent magnet 91 and a yoke 92. Reference numeral 98 denotes a carriage for carrying an optical head 100 having an objective lens 102. The carriage 98 is provided with a pair of coils 104 at opposite positions respectively corresponding to the pair of magnetic circuits 94. The magnetic circuits 94 and the coils 104 constitute a voice coil motor (VCM). When a current is passed through the coils 104, the carriage 98 is guided by the guide rails 96 to move in the radial direction of the magneto-optical disk 24.

A spindle motor 108 is fixed to the drive base 32. A fixed optical assembly 110 having a laser diode 107 and a photodetector 109 is further mounted on the drive base 32. A pair of positioning pins 112 are fixed to the drive base 32. When the cartridge 14 is fully inserted in the magneto-optical disk drive 10, the pins 112 are respectively inserted into the reference holes 28 and 30 of the cartridge 14 to thereby position the cartridge 14 (see FIG. 6).

An eject motor 114 is further mounted on the drive base 32 to eject the cartridge 14 out of the magneto-optical disk drive 10. A cam 116 is connected to an output shaft of the eject motor 114. In the unloaded condition shown in FIG. 6, the cam 116 abuts against an engaging member 118 integral with the load plate 34 to keep the load plate 34 at an unloading position moved in the direction P shown in FIG. 6.

As shown in FIG. 5, a first load cam 120 is mounted on the back surface of the drive base 32 so as to be biased clockwise as viewed in FIG. 5 by a torsion spring 122. A second load cam 124 is fixed to the first load cam 120. As shown in FIG. 6, the first load cam 120 is integrally formed with a projection 120a.

A pair of coil springs 42 and 44 extend under tension between the drive base 32 and the load plate 34. In the unloaded condition shown in FIGS. 4 to 7 where the cartridge 14 is partially inserted in the magneto-optical disk drive 10, the load plate 34 is kept in the upward moved position as viewed in FIG. 5, and the second load cam 124 is engaged with the pin 50 fixed to the base 32. Accordingly, the coil springs 42 and 44 are in the expanded condition, and the downward movement of the load plate 34 as viewed in FIG. 5 is prevented by the engagement of the second load cam 124 and the pin 50.

Since the load plate 34 is kept in the position moved in the direction P as shown in FIG. 6, the pins 54 of the cartridge holder 52 are located in the horizontal portions of the slots 48 of the lift guides 46, and the magneto-optical disk 24 is not yet chucked by the spindle motor 108, but is spaced therefrom. When the cartridge 14 is further inserted into the magneto-optical disk drive 10 from the above unloaded condition, the cartridge 14 comes into abutment against the projection 120a of the first load cam 120 to rotate the first load cam 120 counterclockwise as viewed in FIG. 5 against the biasing force of the torsion spring 122. As a result, the second load cam 124 is disengaged from the pin 50, and the load plate 34 is moved downward as viewed in FIG. 5 by the biasing forces of the coil springs 42 and 44.

Figure 20:
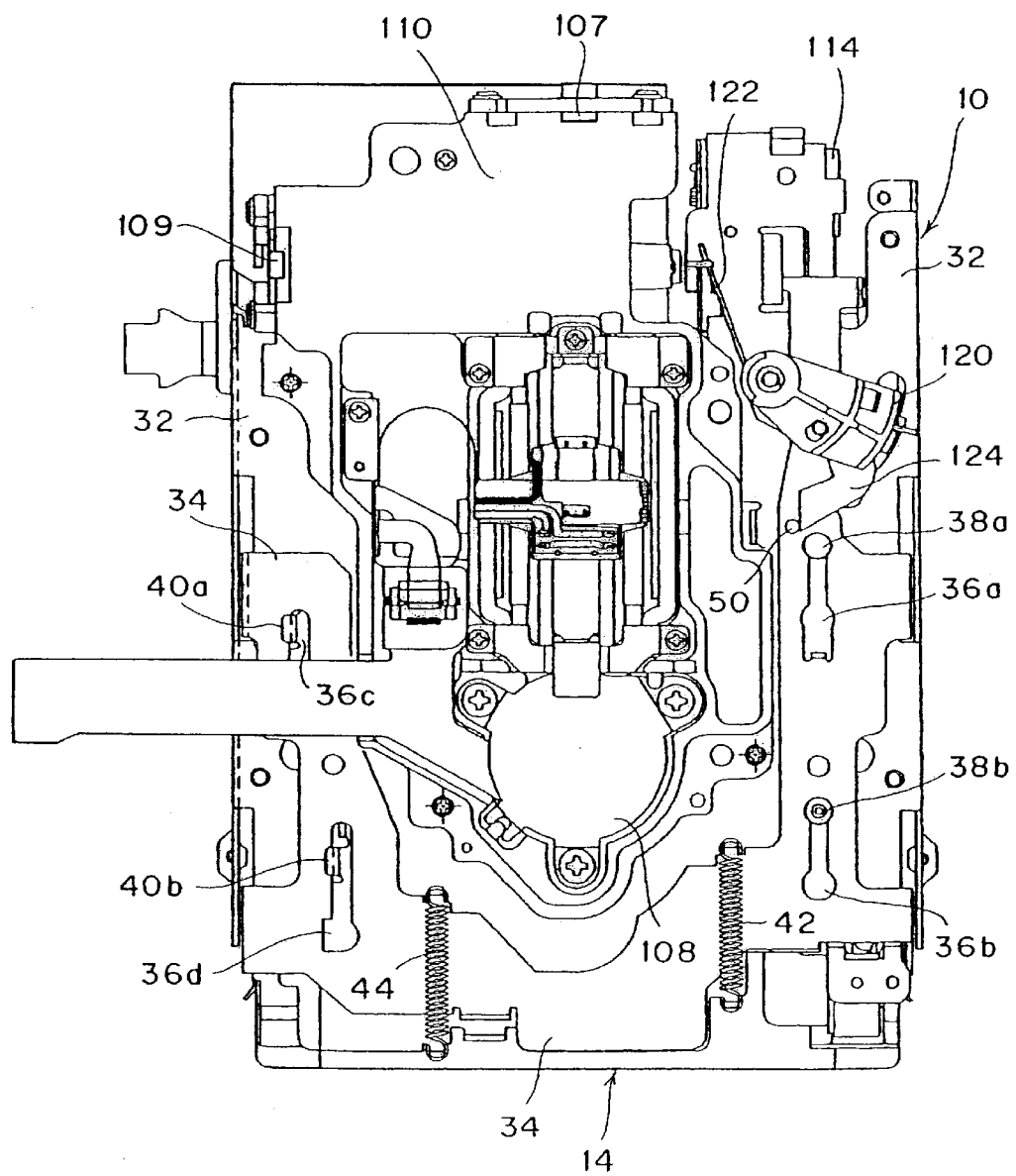
FIG. 20 is a bottom plan view of the magneto-optical disk drive in the condition where the magneto-optical disk cartridge is fully inserted.
Figure 21:
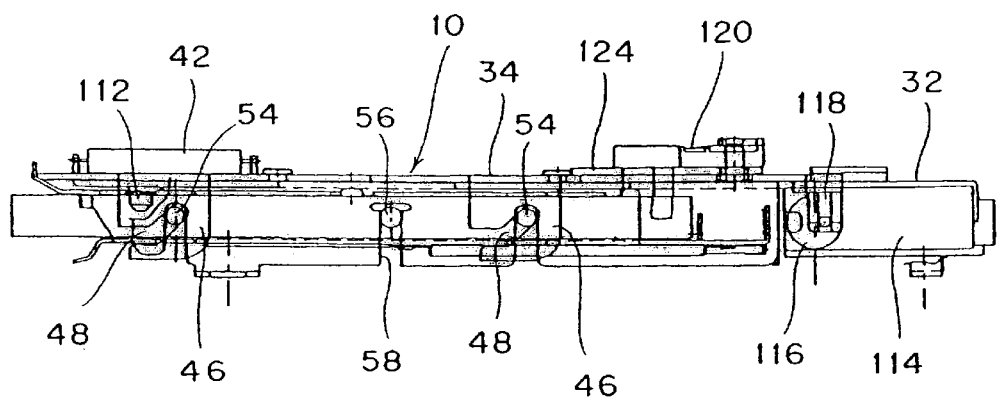
FIG. 21 is a right side view of FIG. 20.

FIGS. 20 and 21 show a condition where the cartridge 14 is fully inserted in the magneto-optical disk drive 10. In concert with the above movement of the load plate 34, the pins 54 of the cartridge holder 52 are moved within the slots 48 of the lift guides 46 from the horizontal portions to the upper ends of the inclined portions as viewed in FIG. 21. Accordingly, the cartridge 14 is moved toward the spindle motor 108, and the magneto-optical disk 24 of the cartridge 14 is chucked by the spindle motor 108. In this loaded condition, the load plate 34 is kept in the downward moved position as viewed in FIG. 20 by the biasing forces of the coil springs 42 and 44, in which the coil springs 42 and 44 are in the contracted condition. In this condition, the spindle motor 108 is driven to rotate the magneto-optical disk 24 and perform reading/writing of data from/to the magneto-optical disk 24.

In ejecting the cartridge 14 out of the magneto-optical disk drive 10, the eject button 13 is depressed by an operator. As a result, the eject motor 114 is driven to make the cam 116 abut against the engaging member 118 of the load plate 34, thereby moving the load plate 34 in the direction P shown in FIG. 6. That is, the load plate 34 is moved upward as viewed in FIG. 20. Accordingly, the abutment of the second load cam 124 against the pin 50 is released, and the first load cam 120 is rotated clockwise as viewed in FIG. 20 by the biasing force of the torsion spring 122, thereby ejecting the cartridge 14 out of the magneto-optical disk drive 10.

The cartridge 14 is further ejected by the biasing forces of the torsion springs 66 and 68 mounted on the cartridge holder 52 until the position shown in FIGS. 4 to 7 is reached. The engagement of the spindle motor 108 and the magneto-optical disk 24 is released during the movement of the load plate 34 in the direction P shown in FIG. 6.

In the above ejecting operation, the flat surfaces 87 of the projecting portions 86a of the first, second, and third cartridge holding assemblies 80, 82, and 84 mounted on the cartridge holder 52 are in elastic contact with the cartridge 14. That is, a moderate frictional force is generated between the cartridge 14 and the flat surfaces 87 of the projecting portions 86a under the spring elasticity of the coil springs 90. Accordingly, the cartridge 14 can be stably ejected as being braked by this frictional force. Furthermore, since the flat surfaces 87 of the projecting portions 86a of the cartridge holding members 86 come into contact with the cartridge 14, it is possible to effectively prevent scratches on the cartridge shell 16.

In ejecting the cartridge 14, the second load cam 124 comes into engagement with the pin 50, thereby preventing the downward movement of the load plate 34 as viewed in FIG. 5. In this condition, the pins 54 of the cartridge holder 52 are located in the horizontal portions of the slots 48 of the lift guides 46 as shown in FIG. 6.

Having thus described some specific preferred embodiments of the present invention applied to a magneto-optical disk drive, the present invention is not limited to the above preferred embodiments, but similarly applicable to any other optical disk drives in which optical disks are selectively loaded to a spindle motor. Further, the present invention is similarly applicable to any other recording devices in which recording media are accommodated in a cartridge shell and the recording media are selectively loaded to a spindle motor.

According to the present invention as described above, the cartridge is held by the flat surfaces of the cartridge holding members, thereby effectively preventing the cartridge from being scratched in inserting or ejecting the cartridge. Further, a stable desired frictional force can be obtained in ejecting the cartridge, thereby improving the stability of ejection of the cartridge. Further, the position of engagement between the sliders and the torsion springs is optimized to prevent an increase in sliding load on the sliders, thereby allowing stable insertion and ejection of the cartridge.

What is claimed is:

1. A storage device capable of accepting a cartridge including a cartridge shell and a recording medium accommodated in said cartridge shell, and reading information recorded on said recording medium, comprising:

a cartridge holder having a main surface for holding said cartridge inserted in said storage device, said main surface having first and second openings spaced from each other in the vicinity of a first side of said cartridge holder and a third opening in the vicinity of a second side of said cartridge holder opposite to said first side, said first and second sides extending in a direction parallel to an inserting direction of the cartridge; and first, second, and third cartridge holding assemblies mounted on said cartridge holder so as to partially project from said first, second, and third openings into said cartridge holder, respectively;

each of said first, second, and third cartridge holding assemblies including a cartridge holding member having a flat surface for holding said cartridge shell, a cover fixed to said cartridge holder, and an elastic member interposed between said cartridge holding member and said cover.

2. A storage device according to claim 1, wherein said cartridge holding member and said elastic member are integrally formed from a leaf spring.

3. A storage device according to claim 1, wherein said flat surface of said cartridge holding member has a reduced surface roughness provided by surface treatment.

4. A storage device according to claim 1, wherein: said main surface of said cartridge holder having a guide groove having a first portion inclined with respect to said second side of said cartridge holder and a second portion parallel to said second side of said cartridge holder; said storage device further comprising: first and second sliders slidably fitted with said guide groove; a first spring having one end engaged with said first slider and the other end engaged with said second slider; and a second spring having one end engaged with said second slider and the other end engaged with said cartridge holder; said first slider being biased by said first and second springs in a direction of ejecting said cartridge inserted in said cartridge holder; an engaging portion between said first slider and said first spring being formed at substantially the same level as that of a slide portion on which said first slider slides.

5. A storage device according to claim 1, wherein said storage device is an optical storage device.

6. A storage device capable of accepting a cartridge including a cartridge shell and a recording medium accommodated in said cartridge shell, and reading information recorded on said recording medium, comprising:

a cartridge holder having a main surface for holding said cartridge inserted in said storage device, said main surface having first and second openings spaced from each other in the vicinity of a first side of said cartridge holder and a third opening in the vicinity of a second side of said cartridge holder opposite to said first side;

a first spring arm having a first portion extending over said first opening, a second portion extending over said second opening, and an intermediate portion extending between said first portion and said second portion, said first spring arm being fixed to said cartridge holder at said intermediate portion so as to extend substantially in parallel to said first side of said cartridge holder; and a second spring arm extending over said third opening substantially in parallel to said second side of said cartridge holder, said second spring arm being fixed at one end portion thereof to said cartridge holder;

said first and second portions of said first spring arm having first and second projecting portions, respectively, said second spring arm having a third projecting portion at the other end portion;

each of said first, second, and third projecting portions having a flat surface for holding said cartridge shell.

7. A storage device according to claim 6, wherein said first and second projecting portions are integral with said first spring arm, and said third projecting portion is integral with said second spring arm.

8. A storage device according to claim 6, wherein said flat surface of each of said first, second, and third projecting portions has a reduced surface roughness provided by surface treatment.

9. A storage device according to claim 6, wherein: said main surface of said cartridge holder having a guide groove having a first portion inclined with respect to said second side of said cartridge holder and a second portion parallel to said second side of said cartridge holder; said storage device further comprising: first and second sliders slidably fitted with said guide groove; a first spring having one end engaged with said first slider and the other end engaged with said second slider; and a second spring having one end engaged with said second slider and the other end engaged with said cartridge holder; said first slider being biased by said first and second springs in a direction of ejecting said cartridge inserted in said cartridge holder; an engaging portion between said first slider and said first spring being formed at substantially the same level as that of a slide portion on which said first slider slides.

10. A storage device according to claim 6, wherein said storage device is an optical storage device.

11. A storage device capable of accepting a cartridge including a cartridge shell and a recording medium accommodated in said cartridge shell, and reading information recorded on said recording medium, comprising:

a cartridge holder having a main surface for holding said cartridge inserted in said storage device, said main surface having a guide groove having a first portion inclined with respect to a side edge of said cartridge holder and a second portion parallel to said side edge of said cartridge holder;

first and second sliders slidably fitted with said guide groove;

a first spring having one end engaged with said first slider and the other end engaged with said second slider; and a second spring having one end engaged with said second slider and the other end engaged with said cartridge holder;

said first slider being biased by said first and second springs in a direction of ejecting said cartridge inserted in said cartridge holder;

an engaging portion between said first slider and said first spring being formed at substantially the same level as that of a slide portion on which said first slider slides.

12. A storage device according to claim 11, wherein each of said first and second sliders is integrally formed with a pair of flanges, each of said flanges having a projection kept in contact with said slide portion.

13. A storage device according to claim 11, wherein each of said first and second sliders is integrally formed with a pair of flanges, each of said flanges having an inclined surface.

14. A storage device according to claim 11, wherein said storage device is an optical storage device.

* * * * *